J. Y. HUMPHREY.
Lamp Chimney.
No. 1,308. Reissued May 13, 1862.
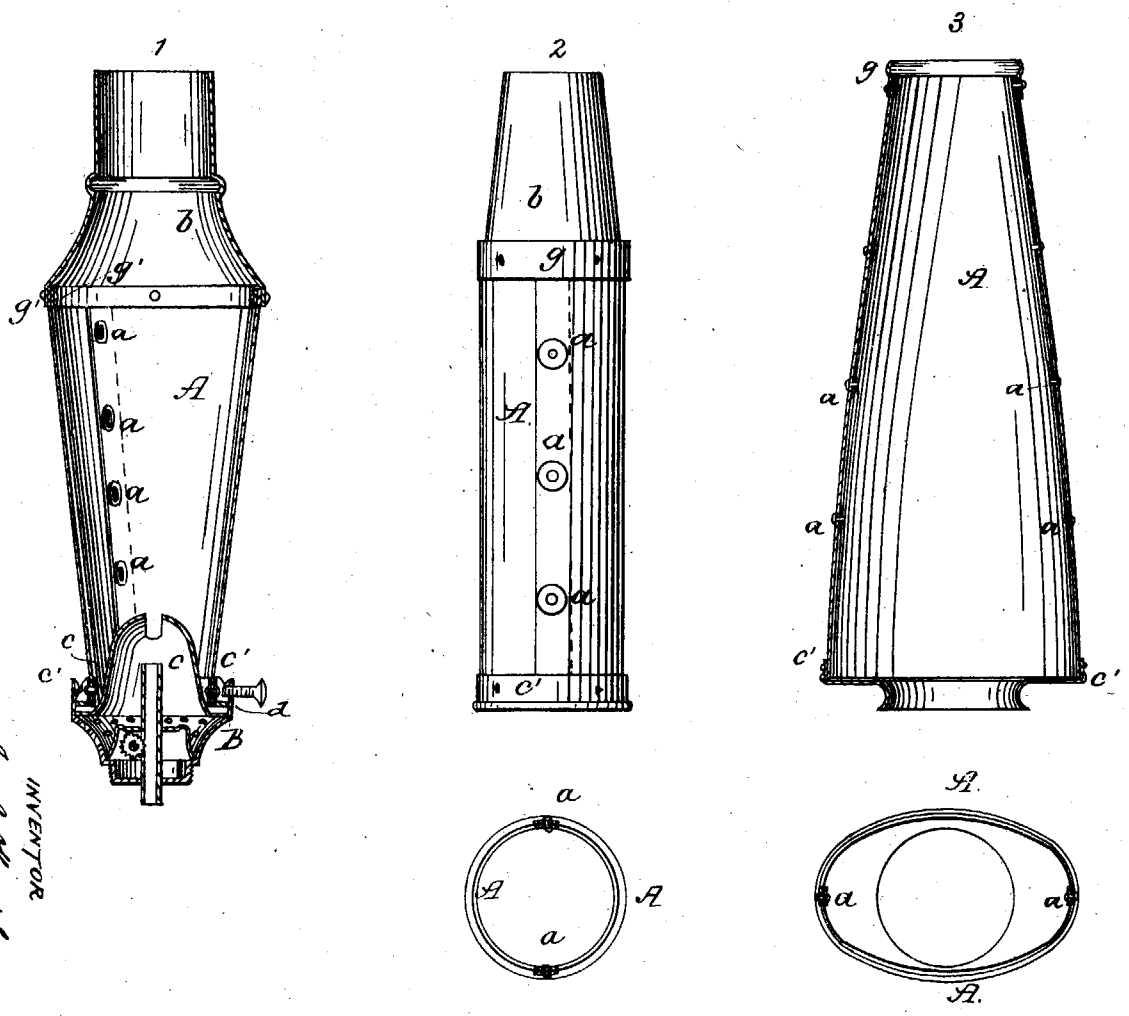
WITNESSES
Gerhard Dietsch
Edwin Ffa ot.
INVENTOR
James Y. Humphrey
Lewis Horning Assig.
by Mason Fenwick & Lawrence
Attorneys
N. PETERS. Photo-Lithographer. Washington, D. C.

UNITED STATES PATENT OFFICE.

LEWIS HORNING, OF PHILADELPHIA, PENNSYLVANIA, ASSIGNEE OF JAMES Y. HUMPHREY.

MICA CHIMNEY FOR LAMPS.

Specification forming part of Letters Patent No. 29,172, dated July 17, 1860; Reissue No. 1,308, dated May 13, 1862.

*To all whom it may concern:*

Be it known that JAMES Y. HUMPHREY, of Philadelphia, in the county of Philadelphia and State of Pennsylvania, has invented a new and Improved Chimney for Lamps, of which said invention I, LEWIS HORNING, of the said city and county, am the assignee and sole owner; and I do hereby declare that the following is a full, clear, and exact description of the same, reference being had to the annexed drawings, making a part of this description and specification.

All burning-fluids which are burned in lamps for illuminating purposes and contain an excess of carbon require to have a proportionate amount of oxygen to support combustion and produce a proper illuminating-flame. This supply of oxygen has hitherto been obtained by means of a draft of air produced by a glass chimney encompassing the flame, the heat of the flame rarefying the air within the chimney and causing a current to pass through it, which current impinges against the flame.

In order to avoid annealing glass chimneys and save expense, they are made extremely thin, so as not to break by a sudden expansion caused by the heat of the flame, the thin glass being heated quite equally throughout. This extreme thinness of the glass, although serving in a great degree to prevent fracture by heat, still renders chimneys extremely liable to break by the slightest jar and concussion, and the breaking of glass chimneys renders the use of coal-oil and other hydrocarbons, which contain an excess of carbon and require their use, very expensive.

In order to obviate this difficulty I construct a chimney of mica in the following manner: A thin sheet of mica, of proper size and shape, is bent into a cylindrical or conical form, as shown in the drawing, and connected at its edges by rivets or other equivalent fastenings and bound at its ends by metallic rings. For this purpose I prefer the use of an outer and an inner flat ring to receive the mica, and I then rivet the whole firmly together, though it is evident that the use of either an outer or an inner flat ring by itself would serve as a support for the ends of the chimney when properly riveted thereto, and thus answer the purpose sought to be effected by the binding above contemplated, though in an inferior degree.

A A is a mica tube forming the body of the chimney. *g g* is the outer upper ring; *g g*, the inner upper ring; C′ C′, the outer lower ring; *c c*, the inner lower ring. *a a* are rivets, either passing through strips of metal or merely through the edges of the mica itself. *b b* is the upper cone, used to give a taper or contraction to the upper end of the chimney.

In all lamp-chimneys it is found indispensable that they should be made smaller at the top than the lower or central portions to avoid the smoke or disagreeable odor which would otherwise be emitted when coal-oil or other burning-fluid containing an excess of carbon is used. When the chimney is made in the form of a cylinder or of a truncated cone, with the base uppermost, I cause the upper outer ring to extend some distance above the top of the mica tube, which extended ring I contract to the proper size at the top; or this upper outer ring may be so constructed as to form the base of another truncated cone extending upward and contracted to the proper size, and which may be formed of mica or other transparent substance; or it may be made entirely of metal or other opaque substance. When the tube of the lamp-chimney is made of a conical form, with the base downward, the construction is more simple. No upper ring, except the binding-ring at the upper extremity, is in that case necessary. By thus constructing the chimney the use of glass may be dispensed with, and equal, if not superior, advantages, as far as transparency is concerned, be obtained, and all the losses from breakage obviated.

The precise shape or form of the mica tubes is quite unimportant so far as the manufacture of them is concerned. They may be made upright, or inverted cones, or cylindrical, as shown in the drawing. The only rule to be specially observed is that the chimney at its upper end should be made very considerably smaller than the middle or lower portions. I prefer making them of such proportions that the superficial area of the section near the top shall not exceed one-half of that at the largest part of the chimney; but I do not limit myself to this proportion, as it may be considerably varied without greatly affecting the working of the lamp.

The mica will not, of course, be affected by the heat of the flame, and will, with ordinary care, last indefinitely. These chimneys may be manufactured quite economically, and will in the end not only be far less expensive than glass chimneys, but the trouble and embarrassment attending the use of the latter and the care requisite in handling and cleaning them, &c., will be fully avoided.

I am aware that it has before been suggested that lamp-chimneys might be constructed of mica; but such chimneys were only proposed to be made of a cylindrical form. Such chimneys would be worthless. For the reasons already stated I lay no claim to them; but—

What is claimed as new, and desired to secure by Letters Patent, is—

1. The construction and use of lamp-chimneys made mainly of mica when the upper end is contracted and made smaller than the lower or middle portions thereof, substantially in the manner and for the purpose above described.

2. Binding the mica chimney of a lamp with rings of metal, substantially in the manner and for the purpose above described.

LEWIS HORNING.

Witnesses:

JOHN H. STEINER,

G. W. STEINER.